(12) United States Patent
Corghi

(10) Patent No.: US 6,457,249 B1
(45) Date of Patent: Oct. 1, 2002

(54) APPARATUS FOR DETERMINING GEOMETRICAL DEFECTS IN A MOTOR VEHICLE RIM AND TIRE MOUNTED ON A TIRE REMOVAL MACHINE, AND THE TIRE REMOVAL MACHINE EQUIPPED THEREWITH

(75) Inventor: Remo Corghi, Correggio (IT)

(73) Assignee: Corghi S.p.A., Reggio Emilia (IT)

( * ) Notice: Subject to any disclaimer, the term of this patent is extended or adjusted under 35 U.S.C. 154(b) by 0 days.

(21) Appl. No.: 09/556,784

(22) Filed: Apr. 25, 2000

(30) Foreign Application Priority Data

May 19, 1999 (IT) .......................... RE99A0064

(51) Int. Cl.⁷ .................. G01B 5/20; G01B 5/28; G01M 17/02
(52) U.S. Cl. .................. 33/554; 33/551; 33/203.12; 73/146
(58) Field of Search ................. 33/203, 203.12, 33/203.13, 542, 543, 544.5, 549, 550, 551, 552, 553, 554, 555, 520; 73/146, 146.2

(56) References Cited

U.S. PATENT DOCUMENTS

| 3,871,106 A | * | 3/1975 | Hegenbart | 33/203.13 |
|---|---|---|---|---|
| 3,942,253 A | * | 3/1976 | Gebel et al. | 33/203 |
| 3,967,498 A | * | 7/1976 | Pezzillo | 73/146 |
| 4,290,205 A | * | 9/1981 | Holm | 33/203 |
| 4,936,138 A | * | 6/1990 | Cushman et al. | 73/146 |
| 4,962,664 A | * | 10/1990 | Hirano et al. | 33/203.13 |
| 5,777,562 A | * | 7/1998 | Hoffman | 33/520 |
| 5,791,059 A | | 8/1998 | Vaccaro et al. | |
| 6,089,083 A | * | 7/2000 | Curtis | 73/146 |
| 6,119,514 A | * | 9/2000 | Piacente et al. | 73/146 |
| 6,256,898 B1 | * | 7/2001 | Trionfetti | 33/551 |

FOREIGN PATENT DOCUMENTS

DE          38 36 540 A1          5/1990

* cited by examiner

Primary Examiner—Diego Gutierrez
Assistant Examiner—Madeline Gonzalez
(74) Attorney, Agent, or Firm—Birch, Stewart, Kolasch & Birch, LLP

(57) ABSTRACT

An apparatus for determining physical and geometrical defects in motor vehicle wheel rims and tires comprises at least one measurement unit to be associated with a self-centering unit of the vertical axis of a tire removal machine, in order to occupy a rest position in which it lies outside the operational region of the self-centering unit and a working position in which it can assume a first measuring configuration in which it is in light contact with a bead retaining flange of the wheel rim of that wheel at that moment, mounted on the moving self-centering unit, and a second configuration in which it is in light contact with the tread of the tire of the mounted wheel, the at least one measurement unit being connected to a system for collecting and displaying the data obtained.

11 Claims, 4 Drawing Sheets

APPARATUS FOR DETERMINING GEOMETRICAL DEFECTS IN A MOTOR VEHICLE RIM AND TIRE MOUNTED ON A TIRE REMOVAL MACHINE, AND THE TIRE REMOVAL MACHINE EQUIPPED THEREWITH

BACKGROUND OF THE INVENTION

1. Field of the Invention

This invention relates generally to the balancing of a motor vehicle wheel rim and tire, and in particular to an apparatus able to directly determine any shape imperfections in the wheel when the wheel is positioned on a self-centering unit of a tire removal machine.

2. Discussion of Related Art

The wheel rim and/or tire part of a vehicle wheel can present various shape imperfections or defects which can disturb vehicle travel during wheel rotation.

The most common imperfections or defects include the following: ovalized wheel rim shape; conical wheel rim shape due to slight diameter differences in the bead retaining flanges; ovalized tire shape: and conical tire tread shape.

The same tire can also have irregular rigidity (or deformity), due to the position and nature of the joints between its inner bands.

The defects or imperfections lead to irregular tire rolling, thus disturbing vehicle travel and decreasing travelling comfort.

The negative effects of the aforesaid shape defects, if present in both the tire and wheel rim, can often be greatly reduced or even totally eliminated by suitably positioning the tire relative to the wheel rim, in order to compensate the defects.

SUMMARY OF THE INVENTION

The main object of this invention is to provide an apparatus able to determine imperfections or defects when a wheel is positioned on the self-centering unit of a tire removal machine, so that account can be taken thereof on removing and remounting the tire.

The object is attained within the framework of a constructionally simple, reliable and low-cost solution usable on existing tire removal machines in general and on tire removal machines of new construction, by virtue of an apparatus having the characteristics defined herein.

The apparatus of the invention comprises at least one measurement unit to be associated with the self-centering unit of a tire removal machine, in order to occupy a rest position in which it lies outside the operational region of the self-centering unit and a working position in which it can assume a first measuring configuration in which it is in light contact with the bead retaining flange of the wheel rim of the wheel at that moment mounted on the moving self-centering unit, and a second configuration in which it is in light contact with the tread of the tire of the mounted wheel, the measurement unit being connected to a system for collecting and displaying the data obtained.

When the at least one measurement unit, described in detail hereinafter, is in a first measuring configuration, it measures any wheel rim ovalization, whereas when in the second measuring configuration it measures any ovalization of the tire tread.

According to a preferred embodiment, the at least one measurement unit is also equipped with means which, simultaneously with the measurement of any wheel rim and tread ovalization, also measure any conicity thereof.

Two measurement units are preferably provided, of which one effects said wheel rim measurements and the other effects the same measurements on the tire tread.

A third measurement unit can be provided to determine any tire flexibility or deformity or irregularities.

Goniometer means, also suitably connected to the collection and display system, are preferably associated with the measurement units in order to provide strict correlation between the error data determined by the measurement units and the respective angular positions.

The apparatus is preferably mounted on a structure which is to be located to the rear of the vertical-axis self-centering unit of a tire removal machine and has a vertical plane of symmetry containing a vertical axis.

BRIEF DESCRIPTION OF THE ATTACHED DRAWINGS

The constructional characteristics and merits of the invention will be apparent from the ensuing detailed description given with reference to the figures of the accompanying drawings, which show a preferred embodiment thereof by way of a non-limiting example.

DETAILED DESCRIPTION OF PREFERRED EMBODIMENT

Figure 1:
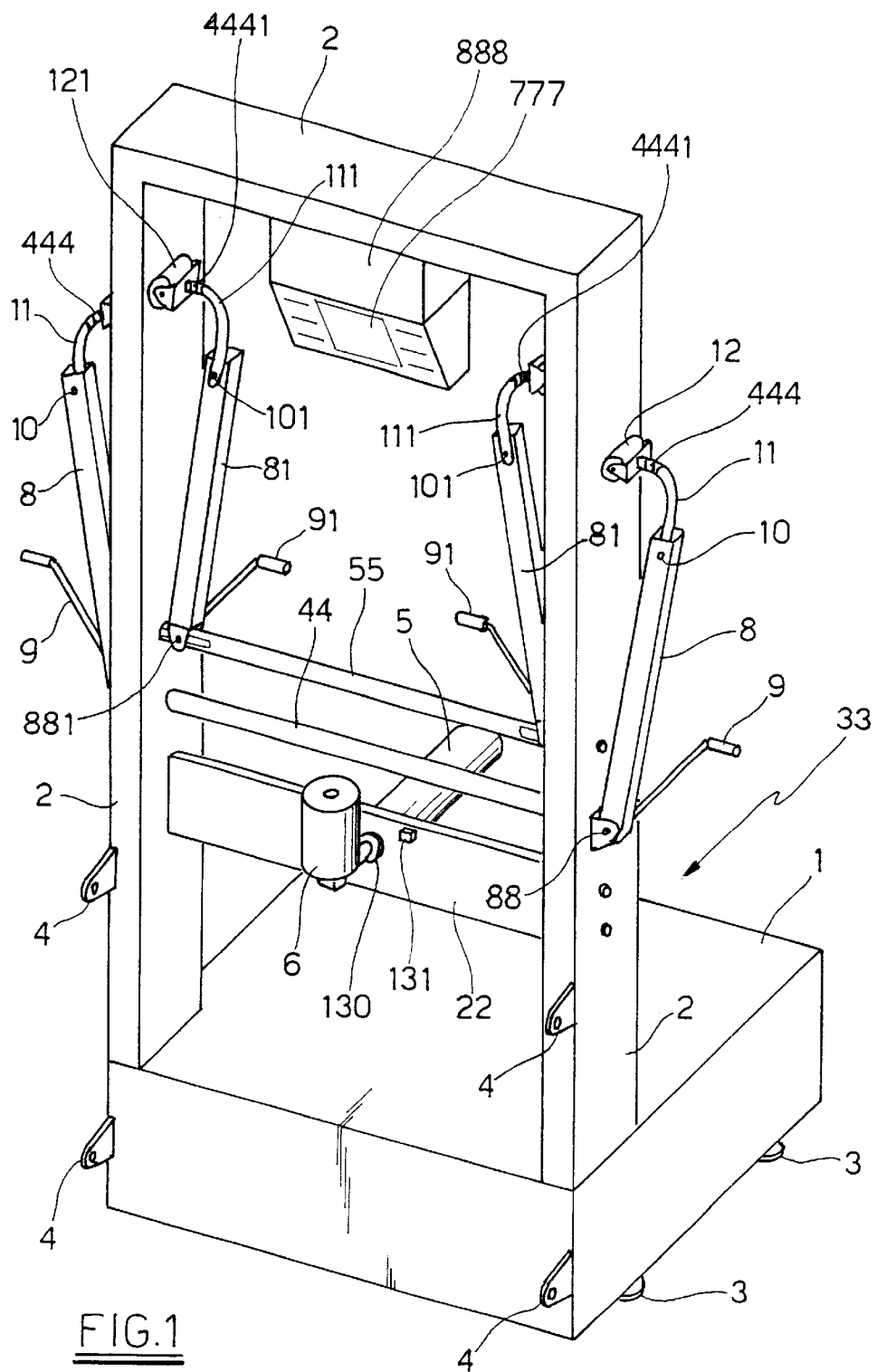
FIG. 1 is a perspective view showing the most equipped version of the apparatus of the invention, to be associated with an existing tire removal machine, the three respective measurement units being shown in a rest configuration.
Figure 2:
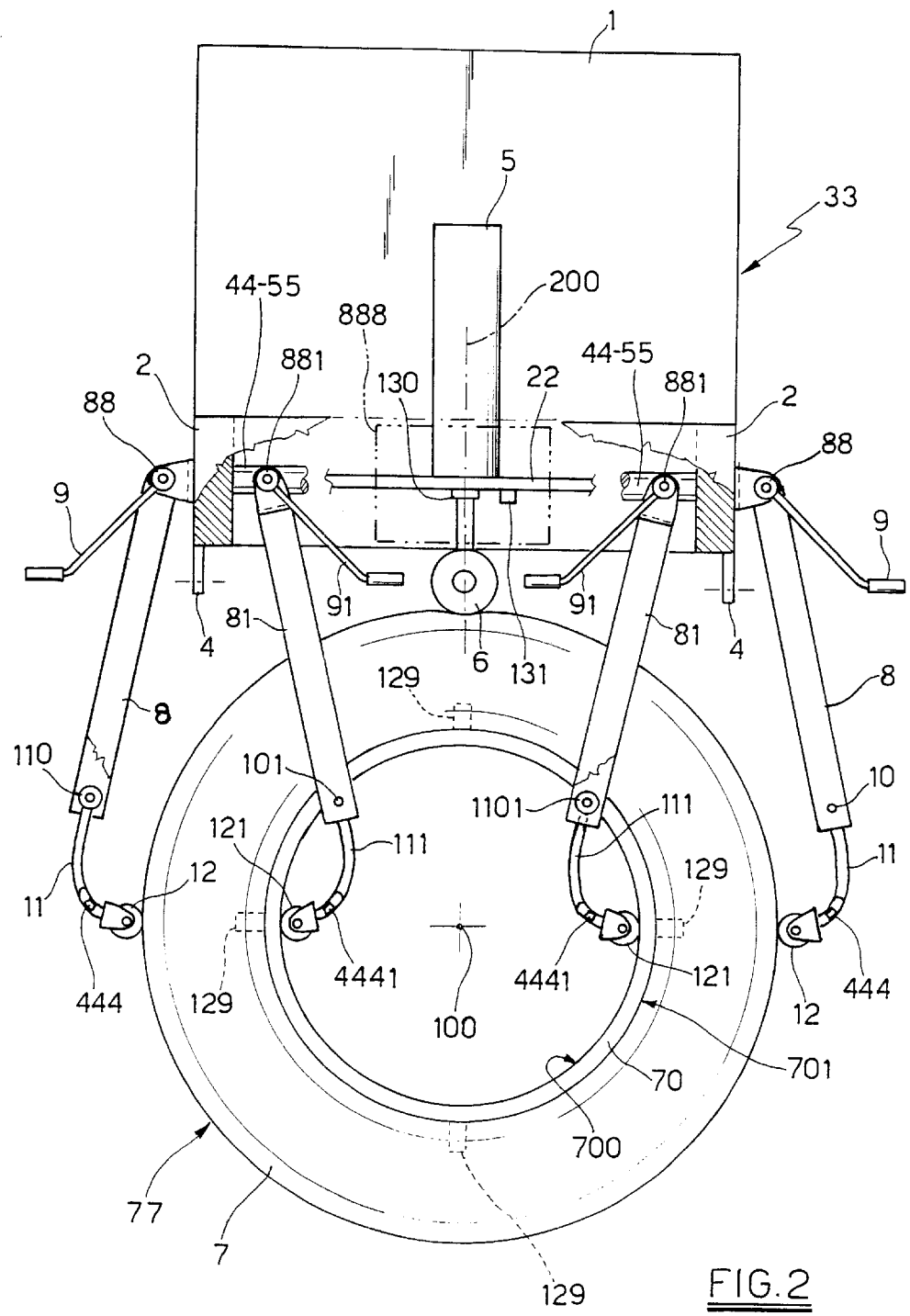
FIG. 2 is a plan view of the preceding figure, with the measurement units shown in a working configuration.

The figures, and in particular FIGS. 1 and 2, show a profiled structure 33 comprising a horizontal square base 1 provided with adjustable support feet 3 and having a portal 2 extending upwards from a marginal flange thereof.

Figure 3:
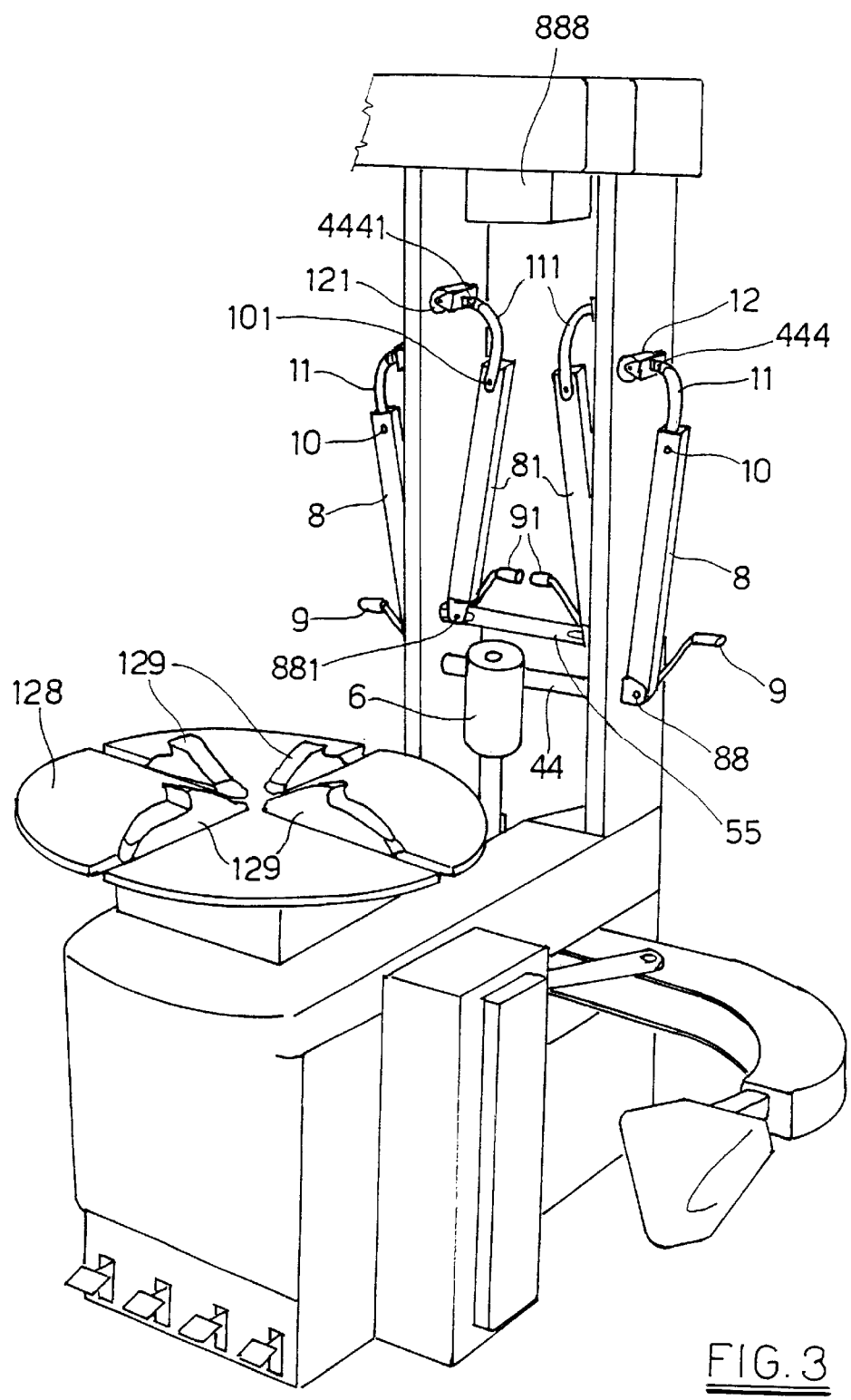
FIG. 3 is a partial perspective view showing a tire removal machine already provided with the apparatus of the invention on manufacture.

The base 1 and portal 2 comprise four holed lugs 4 or other equivalent members, by which the structure 33 can be connected to the body of a tire removal machine with a self-centering unit of vertical axis, for example, of the type shown partially in FIG. 3.

The structure 33 is intended to be connected to the tire removal machine such that the the vertical plane of symmetry 200 (see FIG. 2) of the portal 2 contains the vertical axis 100 of said self-centering unit.

Between the uprights of the portal 2 there are provided, from the bottom upwards, a fixed horizontal plate 22 and a first 44 and second 55 horizontal shaft, these latter being rotatably supported by uprights by way of suitable friction bushings.

Instead of bushings, latches operated by small cylinder-piston piston units can be provided.

To the side of the plate 22 facing the base 1 there is centrally fixed a cylinder-piston unit 5, the rod of which passes through plate 22, beyond which it supports an idle cylindrical roller 6 of vertical axis.

Alternatively, instead of idle roller 6, two side-by-side idle cylindrical rollers of vertical axis can be provided, controlled by the same cylinder-piston unit.

In either case, it is important that idle rollers 6 have a vertical dimension at least equal to the maximum width of the tread 77 of the tire 7.

It is also important for the longitudinal axis of the cylinder piston unit 5 and the axis of the roller 6 to lie in plane 200 of symmetry.

Figure 4:
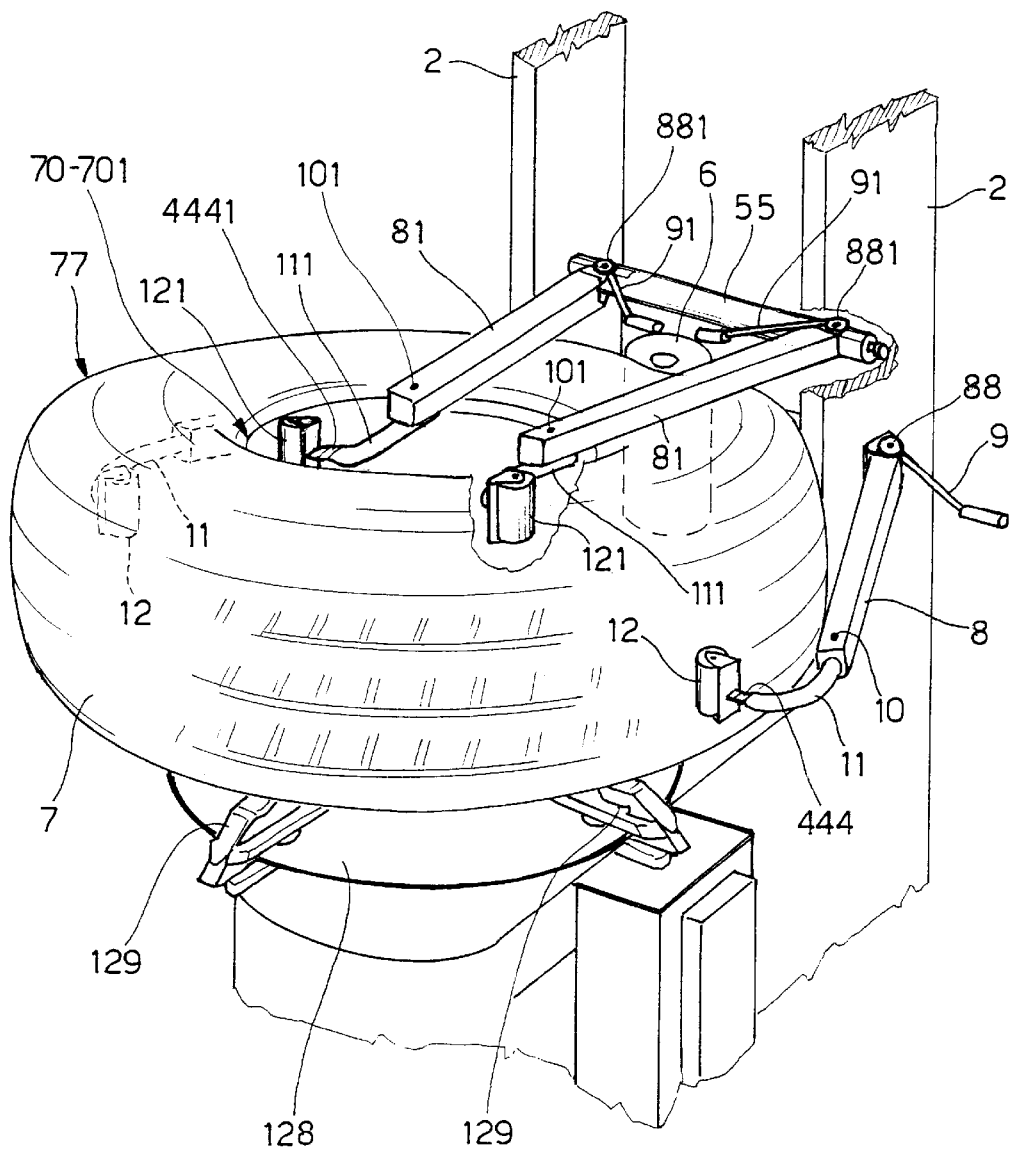
FIG. 4 is a partial perspective view with parts cut away to show how the means of the invention operate on a vehicle wheel.

The roller 6 must act along a horizontal direction representing a radius of the self-centering unit of the tire removal machine, which in FIGS. 3 and 4 is indicated by 128, its jaws being indicated by 129 (see also FIG. 2).

With the rod of cylinder-piston unit 5 there is associated a transducer 130 arranged to measure the small movements to which this rod is subjected while examining a vehicle wheel, which is rotated by the self-centering unit 128.

During examination, the roller 6 is maintained against the tread 77 with a relatively high force, from 200 to 400 kg, so that any discontinuities in the flexibility or elasticity of the tire body can be determined.

An indicator device, indicated by 131 in FIG. 1, is also provided to indicate when the data read by the sensing means of the invention attain maximum (or minimum) values, to enable the values to be correlated with the specific angular positions both of the tire 7 and of the wheel rim 70.

As can be seen, the two ends of the lower shaft 44 extend beyond the uprights of the portal 2 where they carry two hollow arms 8 hinged on respective pins indicated by 88.

The pins have a threaded end, namely the rear end in FIG. 2, on which there is screwed a ring from which a lever 9 branches.

This has two functions, namely to rotate the hollow arms 8 about the axis of the shaft 44, and to lock and release the rotation of the respective hollow arm 8 about its pin 88.

To the other end of each hollow arm 8 there is hinged at 10 an arched appendix 11 having its concavity facing the plane 200, with said hinge 10 there being associated a potentiometer 110 (see FIG. 2)arranged to determine oscillations of the appendix 11 about the arm 8.

The free end of each appendix 11 supports a U-piece carrying a respective idle cylindrical roller 12 which when in the working configuration (see FIGS. 2 and 4) lies with its axis virtually vertical.

When in a working configuration, roller 12 is arranged such that its outer cylindrical surface rolls along the central band of the tire tread 77 (see FIG. 3).

At the moment in which it becomes positioned in a working configuration the roller 12 presses against a central band with a relatively small force, of the order of 0.4–0.8 kg.

As stated heretofore, positioning is effected manually, however there is nothing to prevent this positioning from being effected automatically, as will be apparent to one skilled in the art.

The same considerations apply to the roller 6, the automatic positioning of means being controlled by the data collection and display system with which the machine is supplied and which comprises an externally accessible memory for inserting characteristic data of currently available wheels (wheel rim+tire).

In FIGS. 1 to 3, a data collection system is indicated schematically by 888, the respective display devices being indicated by 777.

That end portion of each appendix 11 to which the respective roller-carrying U-piece is fixed is shaped as a relatively thin plate, on which a strain gauge 444, or better a strain gauge bridge is cemented.

During the tread examination the plate portion lies substantially horizontally (see FIGS. 2, 4).

During the examination the two rollers 12 make contact with the tread 77 at two substantially diametrically opposite points, the potentiometers 110 sensing any circularity defects of the tread 77, and the strain gauges 444 determining any tread conicity.

With regard to the means provided on the upper shaft 55, these are substantially identical to those associated with the underlying shaft 44, and comprise: a hinge pin 881; a control lever 91; a hollow arm 81; an arched appendix 111 hinged on the axis 101 to said hollow arm 81; a potentiometer 1101 (or equivalent); a roller 121; and a strain gauge (or strain gauge bridge) 4441.

In contrast to the arched appendix 11, the arched appendix 111 has its concavity facing the self-centering unit to enable the respective roller 121 to be easily inserted into the hollow of the wheel rim 70 and rest against the ring portion 700 lying internal to the respective bead retaining flange 701.

In the same manner as the rollers 12, during data measurement the rollers 121 rest (with a force of the order of 0.4–0.8 kg) against two substantially diametrically opposite points of said ring portion 700, with the potentiometer 1101 sensing any defects in the roundness of the wheel rim 70, and the strain gauge (or strain gauge bridge) 444 determining any tread conicity.

The aforedescribed data acquiring units are preferably activated simultaneously, i.e., they are arranged as shown in FIG. 2, then to obtain data from the wheel mounted on the self-centering unit this latter is activated, after which the acquired data appear on the display 777.

The said units can also be used only in part, or even individually, for example if only the wheel 70 is mounted on the self-centering unit.

In this case, to verify any ovalization and conicity of the wheel rim 70, the rollers 12 are preferably arranged in contact with the outer circumferential edge 701 of the bead retaining flange as this mode of verification is known to be normally more precise than that achieved with the rollers 12 in contact with the inner ring portion 700 of the bead retaining flange.

Other details of FIGS. 3 and 4 will not be described, stating only that these show a complete tire removal machine, i.e., one in which the apparatus of the invention is incorporated on manufacture, whereas the apparatus shown in FIGS. 1 and 2 can, as already stated, be associated with practically any existing tire removal machine in which the self-centering unit is of vertical axis.

The embodiment illustrated is the most complete, however the apparatus could comprise only two measurement units, associated with the central roller 6 and the pair of opposite rollers 12, or even with the two rollers 12 alone.

In this case these latter have two functions, namely to determine any ovalization and conicity of the wheel rim 70, and any ovalization and conicity of the tread 77.

For this, the supports for the rollers 12 must be modified to enable them to act both on the inside of the wheel rim 70, and on the outside of the wheel rim and tire 7.

The data obtained by the described apparatus are utilized for example in the following manner.

If the examination indicates that the wheel rim and tread both have an oval shape, the operator mounts the tire on the wheel rim such that the major axes of said oval shapes are mutually perpendicular.

If the examination shows that the tread also has a point of greater flexibility, the axis assumed for its oval shape is a false axis rotated about a major axis towards the side on which the weaker point lies.

If it is found that the tread and wheel rim are both conical in shape, with the minor base situated on the same side, the tire is inverted from the position which it had during the examination.

The merits and advantages of the invention, together with its method of operation, are apparent from the aforegoing and from an examination of the accompanying figures.

The invention is not limited to that illustrated and described, but covers all technical equivalents of the stated means and their combinations, if implemented within the context here described.

Thus for example, instead of the specifically mentioned measuring devices, other measuring devices can be provided, for example force measurers, pressure measurers (typically for the cylinder-piston unit 5) or torque measurers.

The roller 6 and the pairs of rollers 12 and 121 can also operate differently from that described, in that the roller 6 does not necessarily have to act in the wheel radial direction, and the pairs of rollers 12 and 121 do not necessarily have to be positioned diametrically opposite each other on the wheel.

Essentially, the rollers can be arranged differently, with any positions different from those already defined being fed into the data collection and display system 888 for appropriate computation.

What is claimed is:

1. An apparatus for determining geometrical defects in motor vehicle tire and wheel rims, comprising:

a self-centering unit for supporting and rotating a wheel rim around a vertical axis;

at least a first measurement unit comprising two side idle rollers, each positioned around a vertical axis so that the rollers rest against two substantially diametrically opposite points of said wheel rim and/or a tire tread respectively while the wheel rim is rotating, each of said idle rollers being mounted on an articulated arm which is hinged to a respective support in such a manner as to enable the arm to swivel in a horizontal plane; and a device for measuring the oscillations of said arm working in conjunction with said first measurement unit, wherein said first measurement unit is connected to a data collection and display system, for collecting and displaying the data.

2. The apparatus as claimed in claim 1, wherein said articulated arm includes a connection part and a distal part which are hinged together, the distal part supporting the respective idle roller.

3. The apparatus as claimed in claim 1, wherein said articulated arm is hinged to a respective support in such a manner as to be able to swivel globally in a vertical plane to assume a position far from the wheel rim and/or the tire tread.

4. The apparatus as claimed in claim 1, wherein said articulated arm includes a connection part and a distal part which are hinged together according to a vertical axis, the distal part supporting the respective idle roller.

5. The apparatus as claimed in claim 4, wherein said device for measuring the oscillations of said arm is provided at the hinge point between said distal part and said connection part of said arm.

6. The apparatus as claimed in claim 4, wherein said distal part is provided with a device for measuring the oscillation of an axis of said idle roller, about the direction orthogonal thereto, wherein said device is the device for measuring the oscillations of said arm working in conjunction with said first measurement unit.

7. The apparatus as claimed in claim 1, further comprising a second measurement unit, having two idle rollers positioned around a vertical axis so that the rollers of the first measuring unit can rest against two substantially diametrically opposite points of said wheel rim and the rollers of the second measuring unit can rest against two substantially diametrically opposite points of the tire tread respectively.

8. The apparatus as claimed in claim 1, wherein a third measuring unit has at least one idle roller of vertical axis which can be moved forward and backwards in a horizontal direction which intersects the vertical axis of said self-centering unit, and is provided with means for measuring the movements of the roller in said horizontal direction when it rests against the tread.

9. The apparatus as claimed in claim 8, wherein said idle roller has a length enabling it to operate over the entire width of the tread.

10. The apparatus as claimed in claim 1, further comprising indicator means arranged to indicate the angular position of the wheel rim and/or the tire tread driven by the self-centering unit when the values measured by the measurement units reach their respective maximum and/or minimum values.

11. The apparatus as claimed in claim 1, wherein said first measurement unit and said data collection and display system are mounted on a support structure mounted to the rear of said self-centering unit, of a vertical axis of a tire removal machine, and has a vertical plane of symmetry arranged to contain the vertical axis of the self-centering unit.

* * * * *